US012791884B2

(12) United States Patent
Chua et al.

(10) Patent No.: US 12,791,884 B2
(45) Date of Patent: Nov. 10, 2026

(54) OPTICALLY ACTIVATED OBJECT MASS TRANSFER APPARATUS

(71) Applicant: Genesee Valley Innovations, LLC, Santa Clara, CA (US)

(72) Inventors: Christopher L. Chua, San Jose, CA (US); Ching-Fuh Lin, Palo Alto, CA (US); Zhihong Yang, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 806 days.

(21) Appl. No.: 17/875,610

(22) Filed: Jul. 28, 2022

(65) Prior Publication Data

US 2024/0036363 A1 Feb. 1, 2024

(51) Int. Cl.
*G02F 1/01* (2006.01)

(52) U.S. Cl.
CPC .................................. *G02F 1/0147* (2013.01)

(58) Field of Classification Search
CPC ............ G02G 1/0147; H01L 21/68707; H01L 21/67781; H01L 21/67766
See application file for complete search history.

(56) References Cited

U.S. PATENT DOCUMENTS

| | | | | |
|---|---|---|---|---|
| 7,195,687 | B2 | 3/2007 | Hayashi et al. | |
| 9,412,727 | B2 | 8/2016 | Menard et al. | |
| 9,496,155 | B2 * | 11/2016 | Menard | H01L 24/26 |
| 10,964,582 | B2 * | 3/2021 | Wang | H10H 20/01 |
| 11,302,561 | B2 | 4/2022 | Wang et al. | |
| 2003/0022403 | A1 * | 1/2003 | Shimoda | H10D 84/90 257/E27.113 |
| 2005/0155699 | A1 * | 7/2005 | Hayashi | H01L 24/18 156/240 |
| 2013/0130440 | A1 * | 5/2013 | Hu | H01L 24/83 438/107 |
| 2013/0210194 | A1 * | 8/2013 | Bibl | H01L 24/95 438/107 |
| 2015/0344755 | A1 * | 12/2015 | Schneider | C09J 183/06 428/164 |
| 2017/0215280 | A1 * | 7/2017 | Chaji | H05K 13/04 |
| 2017/0358478 | A1 * | 12/2017 | Thothadri | H05K 3/305 |
| 2020/0402831 | A1 * | 12/2020 | Wang | H10H 20/857 |
| 2024/0036364 | A1 * | 2/2024 | Chua | G02F 1/0147 |
| 2024/0038574 | A1 * | 2/2024 | Chua | H01L 21/67766 |

OTHER PUBLICATIONS

U.S. Appl. No. 17/875,729; Notice of Allowance issued May 6, 2026; Examiner: Christopher L. Chua. 12 pages.

* cited by examiner

*Primary Examiner* — Tina Wong
(74) *Attorney, Agent, or Firm* — Mueting Raasch Group

(57) ABSTRACT

A transfer apparatus includes a transfer layer formed of a thermally switchable material that undergoes a phase change when heated. A first side of the transfer layer is placed in contact with a chiplet during a transfer operation. An optical absorber material is thermally coupled the transfer layer. An optical energy source is operable to apply optical energy to the optical absorber material to selectively heat a region of the transfer layer that corresponds to a location of the chiplet. The region holds the chiplet when the optical energy is removed during the transfer operation. The region is subsequently heated during the transfer operation to release the chiplet. The transfer layer can be reused for repeated transfer operations.

22 Claims, 18 Drawing Sheets

Section A-A

OPTICALLY ACTIVATED OBJECT MASS TRANSFER APPARATUS

SUMMARY

The present disclosure is directed to transfer layer with optically-activated, repeatable, and reversible rigid-to-soft transitions to facilitate object (e.g., chiplet) mass transfer. In one embodiment, a transfer apparatus includes a transfer layer formed of a thermally switchable material that undergoes a phase change when heated. A first side of the transfer layer is placed in contact with a chiplet during a transfer operation. An optical absorber material is thermally coupled the transfer layer. An optical energy source is operable to apply optical energy to the optical absorber material to selectively heat a region of the transfer layer that corresponds to a location of the chiplet. The region holds the chiplet when the optical energy is removed during the transfer operation. The region is subsequently heated during the transfer operation to release the chiplet. The transfer layer can be reused for repeated transfer operation.

In another embodiment, a method involves causing a transfer layer of a transfer head to contact a chiplet at a first surface of the transfer layer. Optical energy is applied to heat an optical absorber material in or near a region of the transfer layer. The region corresponds to a location of the chiplet. The transfer layer is formed of a thermally switchable material that undergoes a phase change when heated resulting in the region conforming to the chiplet. The optical energy is removed to cause the transfer layer to hold the chiplet. The transfer head is moved relative to a donor substrate or surface to move the chiplet therefrom. The region of the transfer layer is subsequently heated to release the chiplet, wherein the transfer operation can be repeated.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 2:
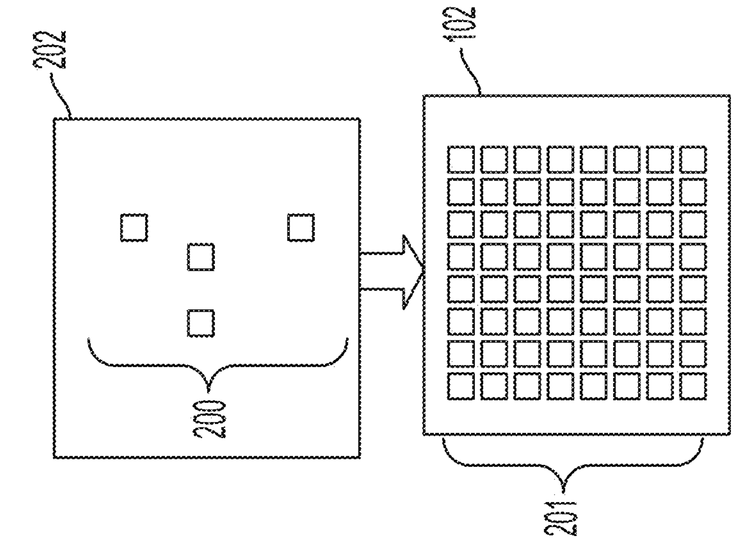
FIGS. 1 and 2 are block diagrams showing an assembly process according to an example embodiment.

The present disclosure relates to manipulation and assembly of objects, and in some embodiments the mass assembly of micro-objects via a transfer substrate. Some electronic devices are fabricated by mechanically overlaying small objects on top of each other. While micro-electronic and micro-optical components are sometimes manufactured using wafer formation techniques such as layer deposition, masking, and etching, certain classes of materials are not growth-compatible with each other. In such a case, the assembly may involve forming one class of devices on a first substrate and a second class of devices on a second substrate, and then mechanically joining them, e.g., via flip-chip or transfer printing techniques.

Aspects described herein relate to a system that is capable of transferring large number of micro objects (e.g., particles, chiplets, mini/micro-LED dies) from a donor substrate to another substrate in parallel while maintaining high position registration of the individual micro objects. This system allows selectively transferring of micro objects from a donor substrate and selectively placing the micro objects to the destination or target substrate. This system may be used for assembling devices such as microLED displays.

Generally, microLED displays are made with arrays of microscopic LEDs forming the individual transfer elements. Both OLED displays and microLED displays offer greatly reduced energy requirements compared to conventional LCD systems. Unlike OLED, microLED is based on conventional LED technology, which offers higher total brightness than OLED produces, as well as higher efficiency in terms of light emitted per unit of power. It also does not suffer from the shorter lifetimes of OLED.

A single 4K television utilizing microLED has ~25 million small LED subpixels that need to be assembled. Mass transfer of chiplets is one technology that may be used for microLED manufacturing. Transferring microLED to a target backplane quickly and accurately with a high yield will be one of the techniques that manufacturers need to perfect in order for microLED to be a viable mass-market product.

The techniques described below can be used for microLED manufacture, as well as other assembly procedures in which a large number of (typically) small objects need to be moved at once, and where it may be necessary to selectively move a subset of such device to and/or from the transfer media. Such micro objects may include but not limited to inks, pre-deposited metal films, silicon chips, integrated circuit chips, beads, microLED dies, lasers, waveguides, photonic components, micro-electro-mechanical system (MEMS) structures, and any other pre-fabricated microstructures. In the present disclosure, these objects may be collectively referred to as "chiplets" in that they are small, individually separable devices or structures amenable to selective mass-transfer from a source to a target.

Being able to selectively transfer chiplets in an arbitrary pattern is useful to facilitate the effective transfer process, pixel repair, hole/vacancy refill for microLED display manufacturing, which will lead to high process yield. An elastomer stamp has been used to deterministically transfer microscale LED chips for this type of application. However, an elastomer stamp has fixed pattern and cannot transfer arbitrary pattern of chiplets. Inevitably, some subset of the chiplets will be defective, and therefore it becomes difficult to replace a select few of them using such a stamp.

Figure 1:
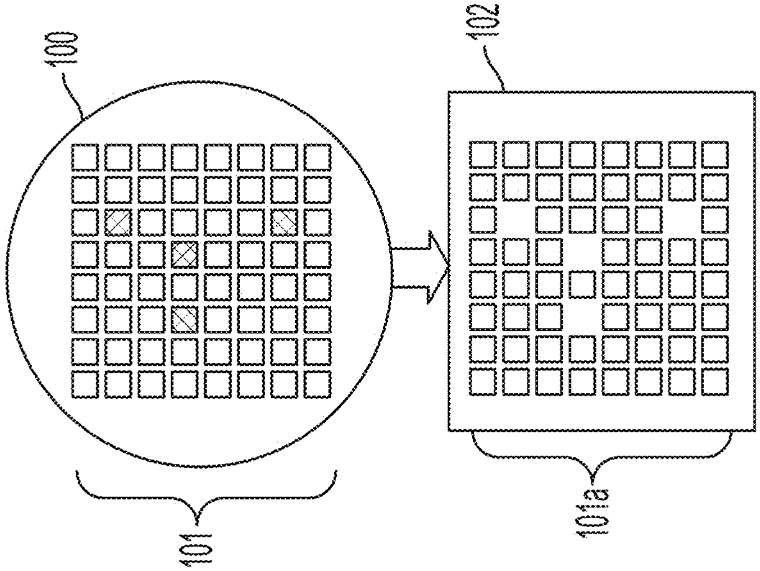

In FIGS. 1 and 2, block diagrams show an example of an assembly process that can be achieved using devices, systems, and methods according to example embodiments. In FIG. 1, a donor wafer/substrate 100 is shown that includes an array of chiplets 101 that may have been grown or placed on the substrate or surface 100. The shaded chiplets in the array 101 have been identified as defective, and when the chiplets are transferred to a target substrate 102, only a subset 101*a* of the chiplet array are transferred, namely the good chiplets that are not shaded. This may be achieved with a transfer head 202 as shown in FIG. 2 that can selectively pick up just the subset 101*a* from the donor substrate 100 once they are identified. As shown in FIG. 2, the transfer head 202 can subsequently pick up a second set of chiplets 200 (e.g., from a different donor substrate). The locations of the chiplets within the set 200 correspond to the locations of the defective chiplets on the first donor substrate 100. The transfer head 202 moves this set 200 to the target substrate 102, resulting in a full set 201 of operational chiplets being located on the target substrate 102.

The present disclosure relates to, among other things, a transfer head with a transfer layer that can be activated at predetermined locations to selectively hold and transfer an array of micro objects on a substrate, or subset thereof. In the latter case, even when the whole transfer layer is in contact with the array of micro objects, only the subset will adhere to the transfer head and be transferred, and the objects outside the subset will be left behind or otherwise unaffected. Similarly, the transfer layer may be able to selectively release a subset of micro objects that are currently attached to the transfer layer, such that only the part of the held objects are released. The transfer layer may non-selectively release the subset as well, e.g., release all chiplets currently held regardless of position. The activation process is repeatable and reversible, such that no permanent bonding or sacrificial material is needed to affect the selective holding or releasing of the objects.

Figure 3:
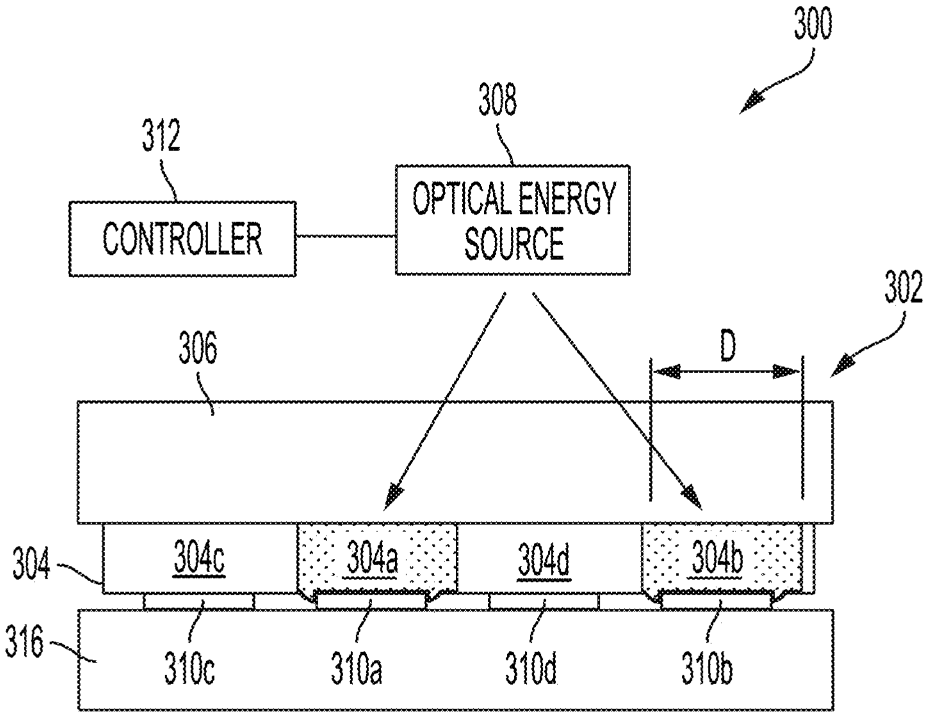
FIGS. 3 and 4 are side views of an apparatus showing part of a transfer operation according to an example embodiment.
Figure 4:
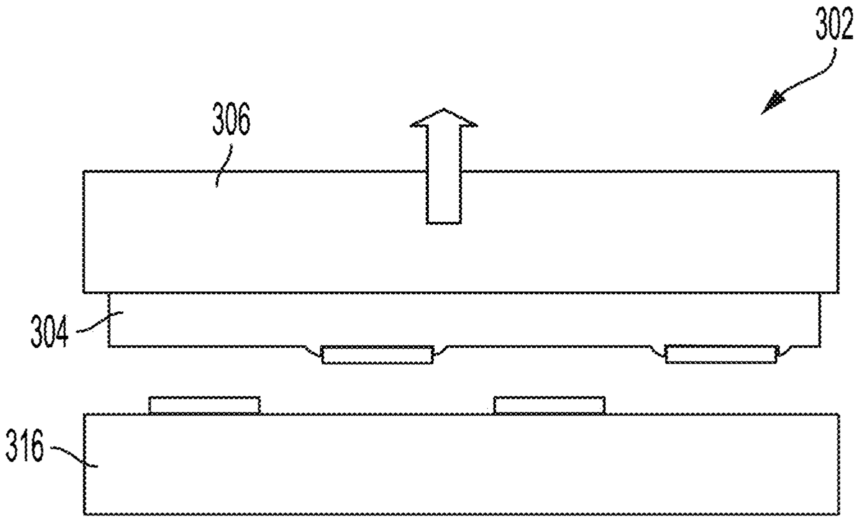

In FIGS. 3 and 4, side views illustrate details of an apparatus 300 according to an example embodiment. As seen in FIG. 3, the apparatus includes a transfer head 302 with a transfer layer 304 formed on a base structure or substrate 306. Portions of the transfer layer 304 can selectively be made to change stiffness via the application and removal of heat to a localized region. The change in mechanical properties of the transfer layer 304 may also be referred to herein as a phase change, e.g., from a solid state to a gelatinous/liquid state.

For example, the stiffness can be expressed as the Young's modulus of the material from which the transfer layer 304 are made. The Young's modulus is a measure of stress (force per unit area) divided by strain (proportional deformation) in a material in the linear elasticity regime. Generally, materials with higher Young's modulus (lower strain for a stress a) is stiffer than a material with lower Young's modules (higher strain for the same a). Other measures may also be used to represent stiffness of a material, such as storage modulus, which also accounts for dynamic performance of the material. Some measures may be used to represent stiffness of a part, such as a spring constant, that may be functionally equivalent in defining performance of the part. However the stiffness is described, the transfer layer 304 can experience a change in stiffness in response to temperature that can be utilized in device transfer as described below.

The transfer/adhesion layer 304 has a higher Young's modulus (e.g., >6 MPa) at a lower temperature and a lower Young's modulus (e.g., <1 Mpa) at a higher temperature. An optical energy source 308 (e.g., a laser) is operable to change a temperature of the regions of the adhesion layer in response to an input from a controller 312. In this case, the optical energy source is coupled to heat portions 304*a*, 304*b* of the transfer layer 304 (the heating indicated by shading), while portions 304*c* and 304*d* are not heated. This example illustrates how the transfer layer 304 can selectively pick up a subset of objects 310*a*, 310*b* from a source substrate 316 while leaving a second subset of objects 310*c*, 310*d* attached to the source substrate 316.

The heated portions 304*a*, 304*b* can deform around the objects 310*a*, 310*b* during the heating, and when the optical energy is removed, then the portions 304*a*, 304*b* re-solidify holding on the objects 310*a*, 310*b*. When the transfer head 302 is moved away from the source substrate 316 as shown in FIG. 4, objects 310*a*, 310*b* will be pulled from the source substrate 316 while objects 310*c*, 310*d* remain on the source substrate 316. When the transfer head 302 is moved over and in contact with a target substrate/backplane (not shown), the portions 304*a*, 304*b* are reheated either via the optical energy source 308 or a different energy source allowing the objects 310*a*, 310*b* to be released onto the target substrate, which may have means for holding, adhering to, or attracting the objects 310*a*, 310*b* to ensure separation from the transfer head 302. Note that in the release phase, the entire transfer layer 304 may be heated and not just portions 304*a*, 304*b*, assuming that all currently attached chiplets are to be released.

The apparatus 300 may be part of a micro-transfer system, which is a system used to transfer micro-objects (e.g., 1 μm to 1 mm) from the source substrate 316 to a target substrate. The transfer layer 304 may be formed of a multi-polymer that contains stearyl acrylate-based (SA). In such a case, a difference between the higher and lower temperatures may be less than 20° C. (or in other cases less than 50° C.) in order to adjust the tackiness of the transfer layer 304 such that there is a marked difference in Young's modulus, e.g., from <1 Mpa at the higher temperature to >6 Mpa at the lower temperature. The controller 312 in such as a system may be coupled to actuators (not shown) that induce relative motion between the transfer head 302 and substrates to facilitate object transfer as described herein.

Generally, the transfer layer 304 forms an intermediate transfer surface whose compliance can be modulated (e.g., have a sharp rigid-to-soft transition) as a function of temperature. Such a surface can be used to pick up and release groups of micro-objects in a controlled and selectable manner. The optical energy source 308 may be optically coupled to mirrors, lenses, waveguides, and the like to selectively create hotspots on the transfer layer 304. The controller 312 can switch the optical energy source 308 off and on so that only selected regions are heated. The hotspots may have diameter D from sub-micrometers to several hundreds of micrometers and may be adjustable via optics and power inputs to the optical energy source 308. The pitch of the hotspots may vary from sub-micrometers to several millimeters. The base structure 306 may be formed of a transparent material at the wavelengths used by the optical energy source 308, such as glass, quartz, silicon, polymer and silicon carbide (SiC). The base structure 306 may have a thickness that ranges from several tens of microns to several millimeters and lateral dimensions from several millimeters to one meter.

Phase-changing polymer comprising stearyl acrylate (SA) has been studied as a bistable electroactive polymer (BSEP) for use in the adhesion layer. The BSEP polymer is a rigid polymer below its glass transition temperature (Tg). Above Tg, it becomes an elastomer that exhibits large elongation at break and high dielectric field strength. Electrical actuation can be carried out above Tg with the rubbery BSEP functioning as a dielectric elastomer. The deformation is locked when cooling down the polymer below Tg. The shape change can be reversed when the polymer is reheated above Tg.

Stearyl acrylate (octadecyl acrylate, SA) based polymers have been investigated as shape memory polymers due to their sharp phase transition between the crystalline and molten states of the stearyl moieties. The abrupt and reversible phase transition of the crystalline aggregates of the stearyl moieties results in a rapid shift between the rigid and rubbery states of the polymers during temperature cycles. The transition of SA is typically below 50° C. with a narrow phase change temperature range of less than 20° C. Therefore, SA is an ideal component for imparting a sharp rigid-to-rubbery transition.

The adhesion layer 304 may be made of materials including but not limited to stearyl acrylate (octadecyl acrylate, SA) based polymers, stearyl acrylate and urethane diacrylate copolymer or other types of polymers. In particular, a copolymer containing urethane diacrylate and SA has been found to have desirable characteristics for these purposes. The adhesion layer 304 preferably has a sharp rigid-to-soft transition therefore the adhesion can be easily modulated with temperature change.

The transfer layer materials described above are transparent at laser wavelengths commonly used in mass assembly systems, e.g., green and blue lasers. Thus, when using lasers of these wavelengths, the transfer layer 304 may not be directly heat-able by the optical energy source 308 but can instead be heated by an optical absorber proximate the inward and/or outward facing surfaces of the transfer layer. In other embodiments, the transfer layer 304 may include adaptations that allow it to be directly optically heated without the use of a separate optical absorber layer.

Figure 5:
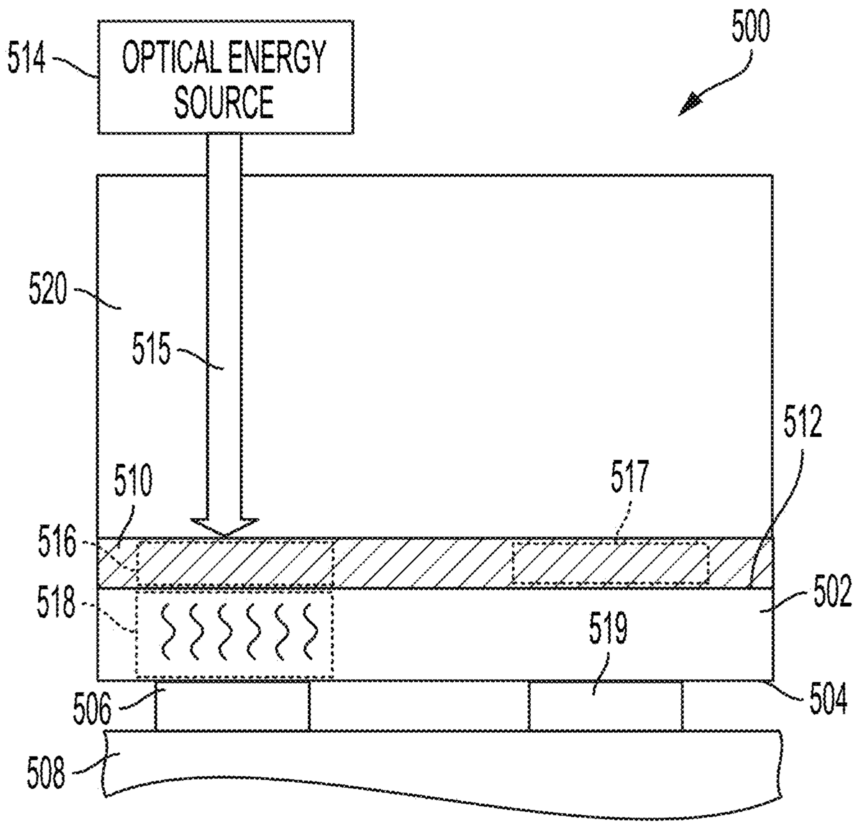
FIGS. 5, 6, and 7 are side views of transfer heads according to various embodiments.
Figure 6:
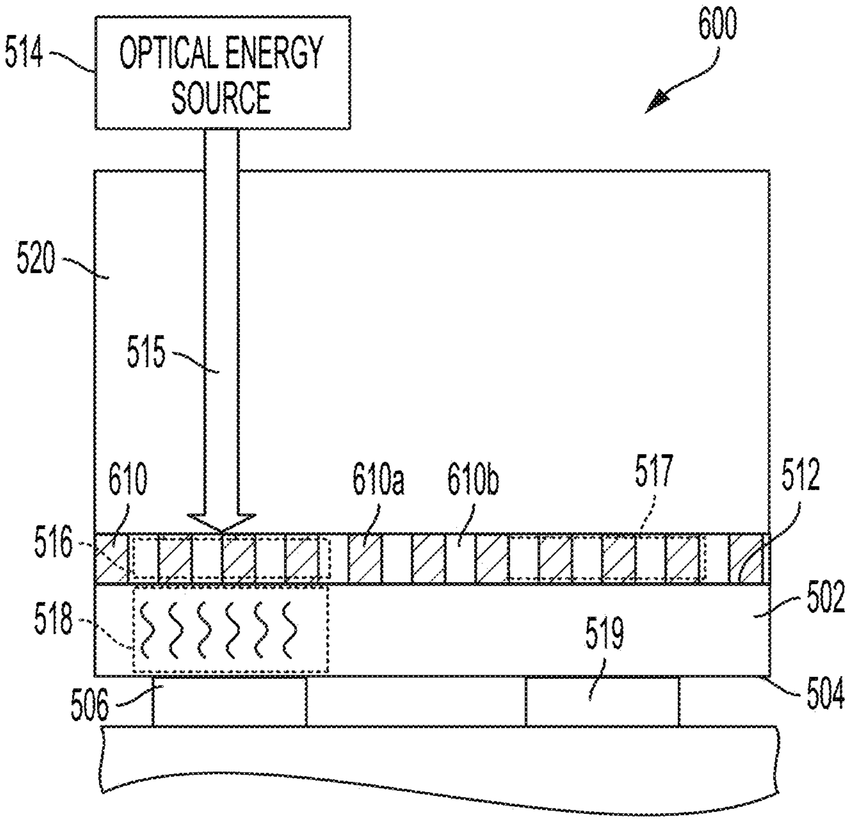

In FIGS. 5 and 6, diagrams show an example of an optical absorber that can be used in a transfer head apparatus 500 according to an example embodiment. The transfer head 500 includes a transfer layer 502 formed of a thermally switchable material that undergoes a phase change when heated. A first side 504 of the transfer layer 502 is placed in contact with a chiplet 506 during a transfer operation. The transfer operation may include, for example, selectively removing the chiplet 506 from a source substrate or surface 508 (also referred to herein as a donor substrate or surface), moving the chiplet 506 to a target substrate or surface (not shown), and releasing the chiplet 506 onto the target substrate or surface. The chiplet 506 can be any microscale object, a large number of such objects being typically arrayed on the substrate or surface 508.

An optical absorber layer 510 is thermally coupled to a second side 512 of the transfer layer opposed to the first side 504. The transfer head 500 may include a substrate 520 or other base structure that holds and supports both the transfer layer 502 and the optical absorber layer 510. An optical energy source 514 is operable to apply optical energy 515 (e.g., a scanned laser beam) to a region 516 of the optical absorber layer to selectively heat an associated region 518 of the transfer layer that corresponds to a location of the chiplet 506. The associated region 518 holds the chiplet when the optical energy 515 is removed during the transfer operation, e.g., after a phase change in region 518 has caused the switchable material to conform to and grip the chiplet 506. Note that the substrate 520 may be transparent at the wavelength of the optical energy 515, or may have other features (e.g., voids) that allow the optical energy 515 to pass to the optical absorber layer 510.

Removal of the optical energy 515 causes the switchable material to harden in while gripping the chiplet 506, such that when the transfer head 500 is pulled away from the source substrate or surface 508, the chiplet 506 is removed from the source substrate or surface 508. During this part of the transfer operation, if no optical energy was previously applied to another region 517 of a nearby chiplet 519, this chiplet 519 will remain on the source substrate or surface 508 when the transfer head 500 is pulled away from the source substrate or surface 508 (or the source substrate or surface 508 is pulled away from the transfer head 500).

After removal of the targeted chiplet 506 from the source substrate or surface 508, the transfer head 500 can then be moved to the target substrate or surface where the chiplet 506 is placed. The associated region 518 can be subsequently heated via the optical absorber layer 510 or by some other means to release the chiplet 506 during this release part the transfer operation, allowing the target chiplet 506 to be transferred to the target substrate or surface. The phase transition that enables selective holding and releasing of the chiplet 506 by the transfer layer 502 is repeatable and reversible, such that it can be repeated for multiple different chiplets in subsequent transfer operations. Note that during the release part of the transfer operation, selective heating of the optical absorber layer may not be needed since all chiplets currently on the transfer head 500 may be released at once. In such case, the entire transfer layer may be heated, e.g., via non-selective application of the optical energy or alternate means. The selective or non-selective subsequent application of thermal energy for releasing chiplets include laser irradiation, optical exposure, infrared lamp heating, electrical joule heating, inductive heating, RF heating, hot plate heating, conductive heating, convection heating, forced air, or a combination of different means.

As seen in FIG. 5, the optical absorber layer 510 can be a thin film formed as a contiguous sheet (e.g., blanket deposited) against the thermally-switchable material of the transfer layer 502. As seen in FIG. 6, another embodiment of a transfer head 600 may include an absorber layer 610 that is patterned, as indicated by alternating absorbing and transparent regions 610*a*, 610*b*. A partially transparent, patterned metal absorber layer 610 has a convenient see-through characteristic that allows for observing or aligning of the underlying objects being picked and placed. This may facilitate optically detecting alignment fiducials one on or both of the chiplets 506, 519 and the substrates or surfaces on which the chiplets 506, 519 are placed or from which the chiplets 506, 519 are removed. The pattern of the absorber layer 610 may include lines and spaces, a mesh, an array of dots, or any combination thereof.

Figure 7:
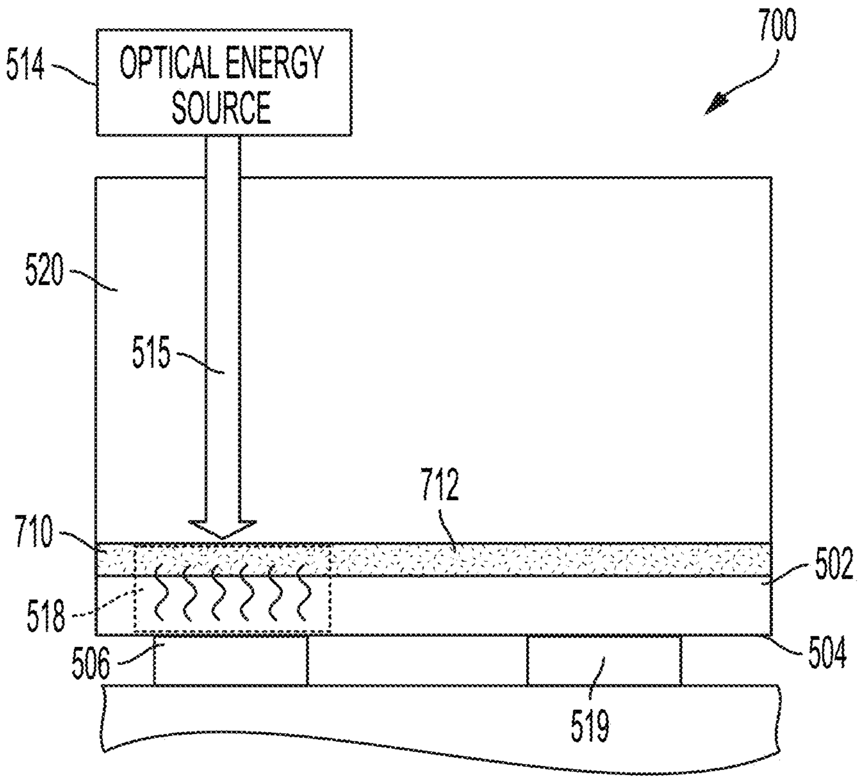

In FIG. 7, a diagram shows a transfer head 700 with an alternate embodiment of an absorber layer 710 or optical absorbing transfer layer. The absorber layer 710 is implemented as constituents of an optical absorber material 712 incorporated within the switchable material of the transfer layer 502, such as mixed-in nano-scale quantum dots or carbon fibers. In the illustrated example, the optical absorber material 712 is shown extending partway to the first side 504 of the transfer layer 502. In other embodiments, the optical absorber material 712 may extend fully to the first side 504 such that the transfer layer 502 and absorber layer 710 are functionally the same layer, in which case it may just be referred to as the transfer layer 502 or an optical absorbing transfer layer.

The optical absorber material 712 may cover the entire surface of the absorber layer 710 or be patterned such as shown in FIG. 6 such that some regions of the combined transfer layer 502 and absorber layer 710 are transparent, e.g., if the mixed-in optical absorber material 712 results in a non-transparent layer at the wavelengths of interest. In other embodiments, the optical absorber material 712 may be dispersed enough or have optical properties such that the layers 502, 710 can still be seen through, e.g., for purposes of chiplet alignment. The constituents of the optical absorber material 712 can be wavelength-selective or can be designed to have band-pass properties that is absorbing across certain wavelength ranges and transparent to light at other wavelength ranges.

As noted above, part or all of the print head surfaces facing the chiplets may be transparent to facilitate alignment of the print head with the chiplets and/or chiplet-holding substrates. One or both of the print head and chiplets may have fiducials to assist in this alignment. Fiducials may include markings specially made for alignment of components (e.g., printed markings) and/or may include optically detectable features of the components themselves, e.g., edges, bond pads, etc.

Figure 8:
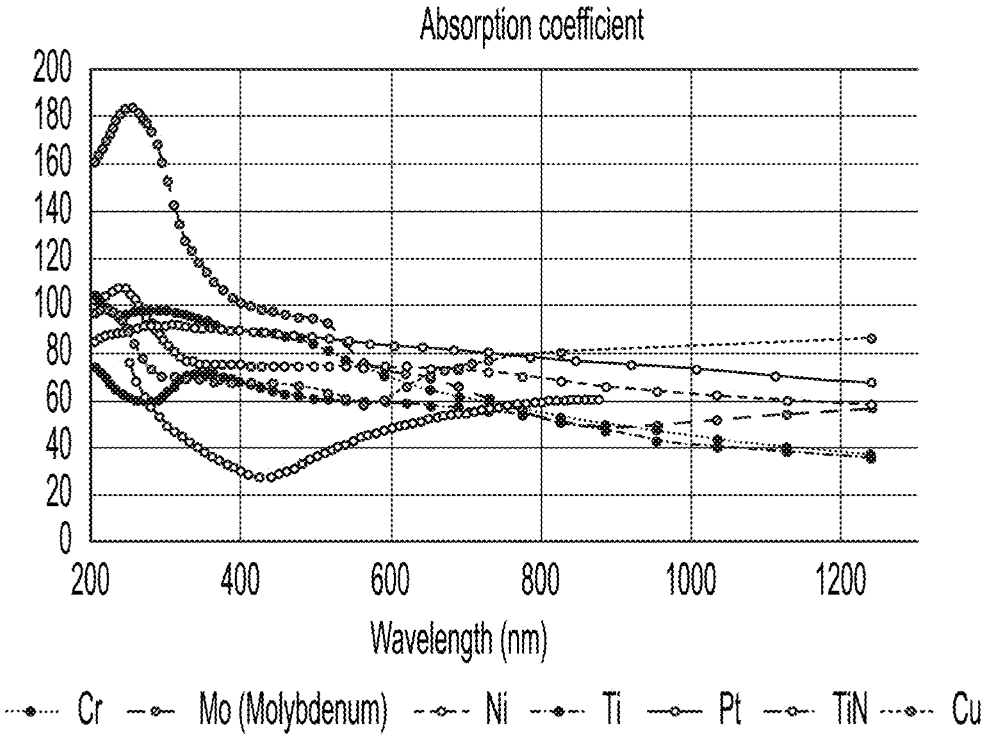
FIG. 8 is a graph showing absorption properties of an absorptive material according to example embodiments.

The material used in the absorber layers described above can be one of or a combination of metal, carbon, and semiconductor. The optical absorber material may be a full absorber in one or more embodiments, such as carbon (broad spectrum) or silicon (at wavelengths below 1.1 μm), partially reflecting such as metal (e.g., Ni or Pt), partially absorbing, or absorbing at select wavelengths such as optical band pass filters. A semiconductor optical absorber material may include at least one of silicon, amorphous silicon, polysilicon, and TiN. A metallic optical absorber material may include one of or a combination of Pt, Ni, Ti, Cr, Mo, and Cu. In FIG. 8, a graph shows absorption coefficients as a function of wavelengths for various metals that could be used as an absorber material in the various embodiments described above.

Figure 9A:
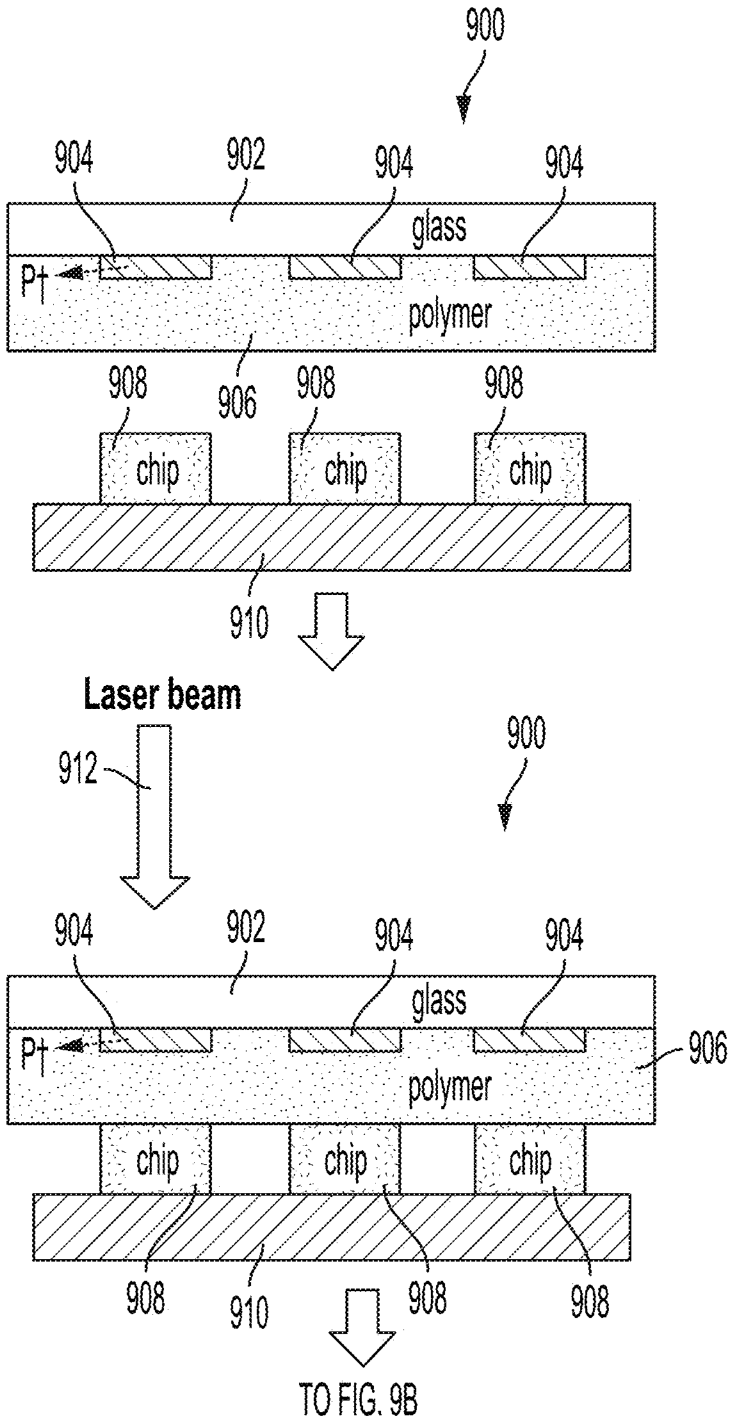
FIG. 9A-9C are diagrams showing a sequence of a transfer operation according to an example embodiment.
Figure 9B:
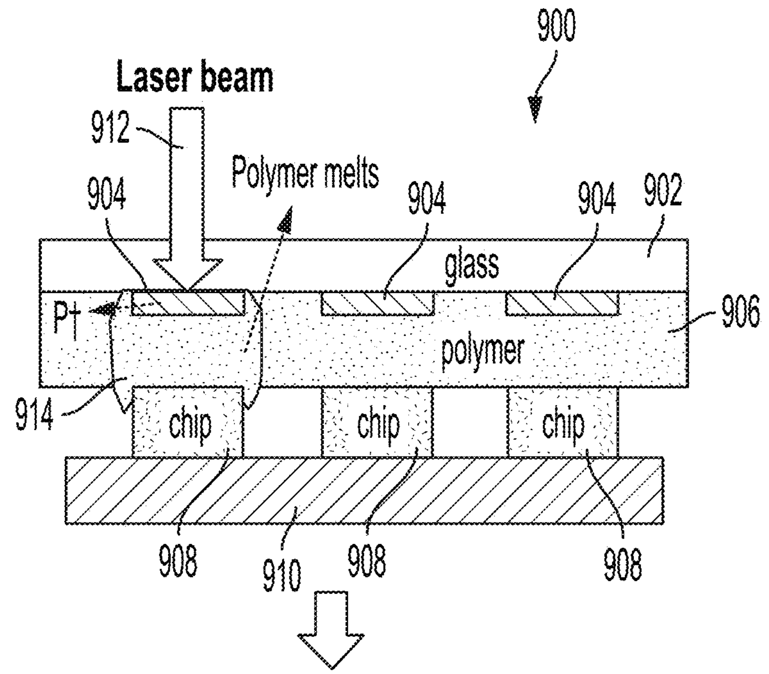
Figure 9B:
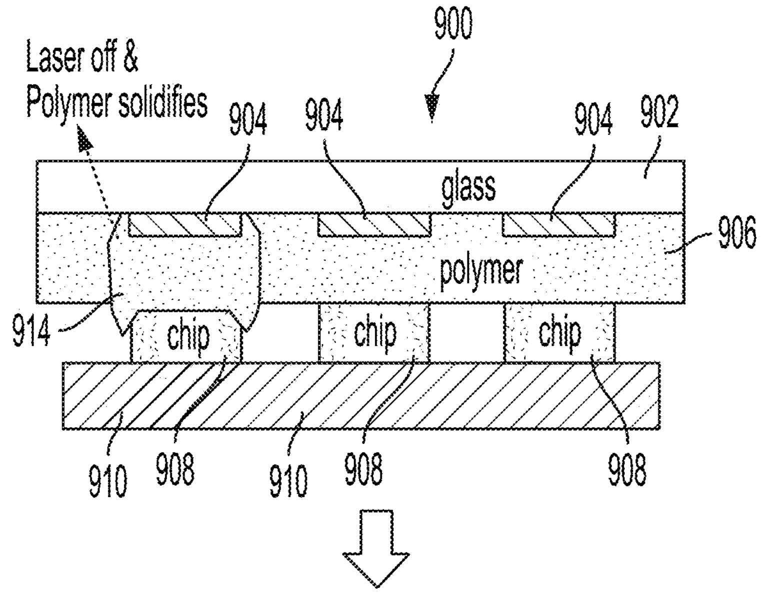
Figure 9C:
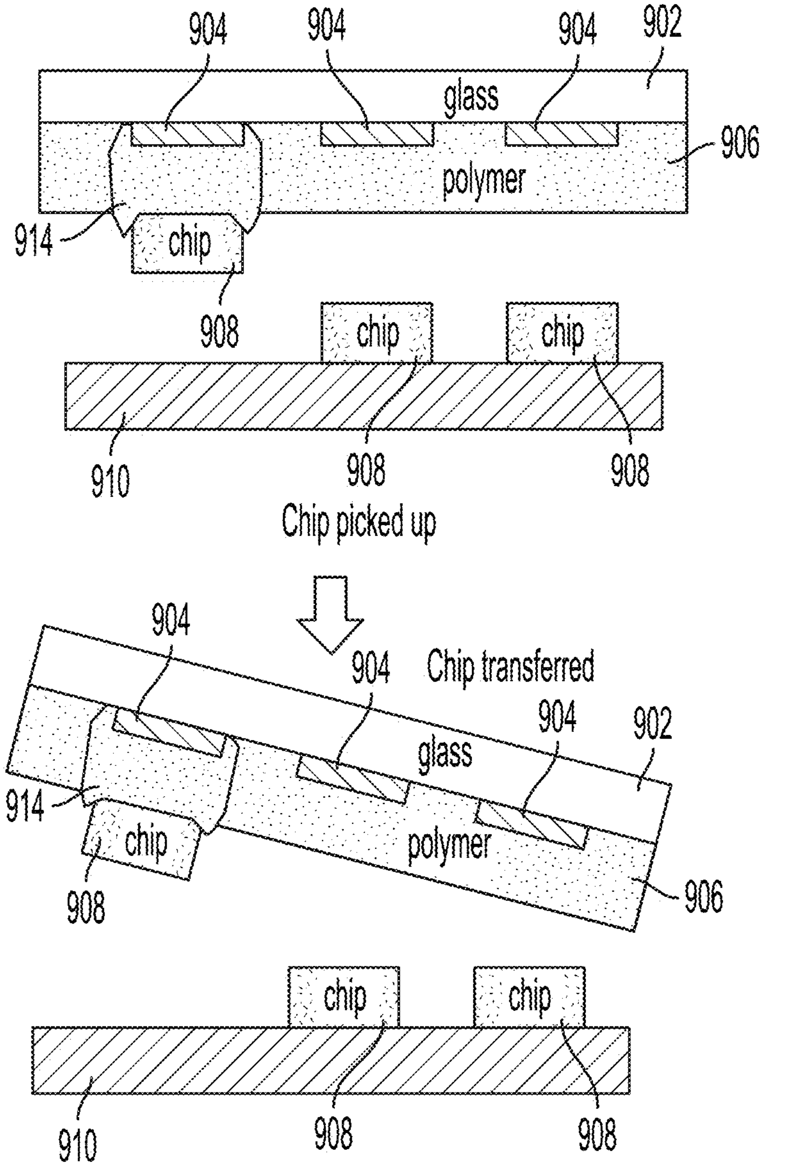

To test the concept, an embodiment was experimentally evaluated that used patterned 100 nm-thick Pt metal as the absorber. Platinum was chosen for this example because it is convenient to deposit and exhibits high absorption at the chosen laser wavelength ($\lambda$=445 nm). In FIGS. 9A-9C, diagrams show an illustration of the laser activation process performed during the experiments. Generally, a transfer head 900 includes a base support layer 902 (e.g., glass), optical absorber layer 904, and a transfer layer 906. In the upper left of the figure, the transfer head 900 is positioned over chiplets 908 located on a donor substrate 910. Next, optical energy 912 is applied to one part of the optical absorber layer 904, resulting in a region 914 of the transfer layer 906 melting as seen in the top of FIG. 9B. This region 914 cools allowing one of the chiplets 908 to be lifted off as shown in FIG. 9C.

Figure 10A:
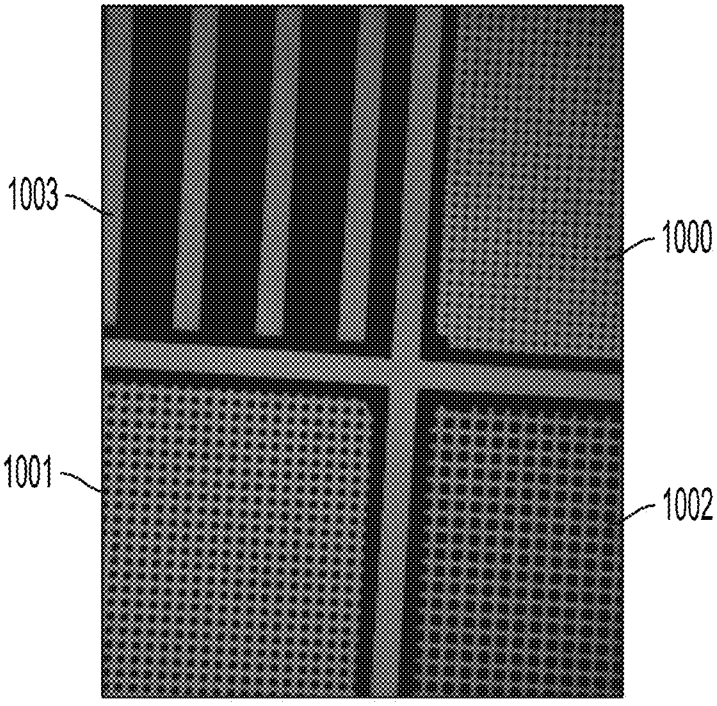
FIGS. 10A and 10B are optical micrographs of absorber layer features according to example embodiments.
Figure 10B:
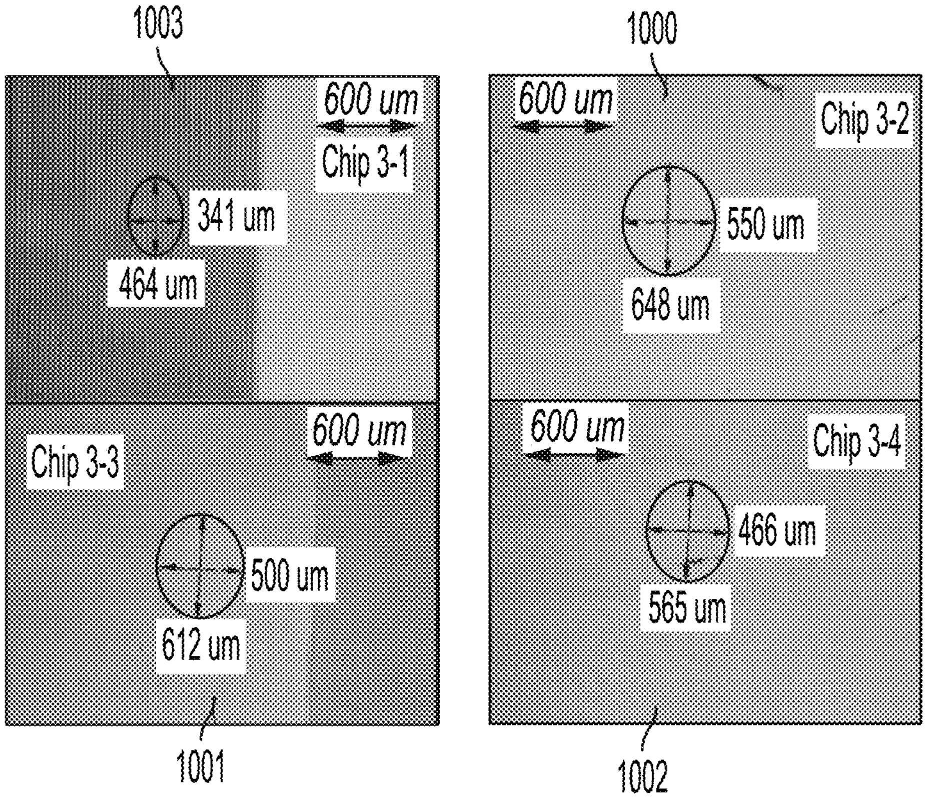
Figure 10C:
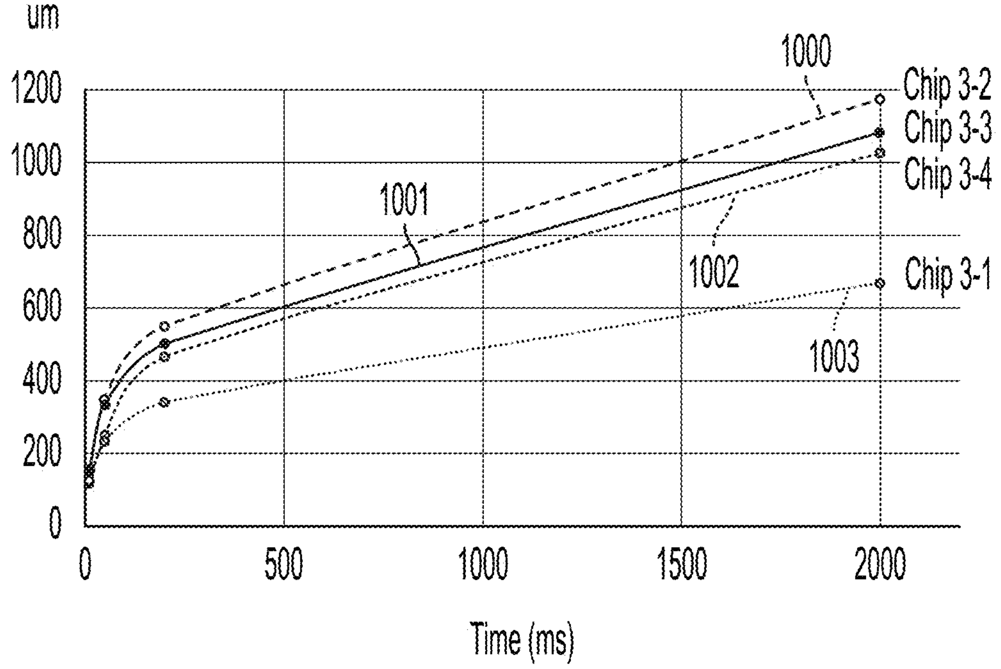
FIG. 10C is a graph showing the size of activated regions versus exposure duration for different transfer head absorber patterns according to example embodiments.

As part of the test matrix, different metal patterns were designed and fabricated including stripes, meshes, and dots with different dimensions and fill factors. The openings in the pattern are convenient because they are transparent and allow visual observation and alignment of the objects being picked up. In FIG. 10A, an optical micrograph shows a plan view of a completed transfer head with four different metal absorber patterns 1000-1003 corresponding to different fill factors. The gaps between metal lines are 2, 3, 4, and 20 μm for patterns 1000-1004, respectively. The widths of the metal lines are 2 μm for patterns 1000-1002 and 10 μm for pattern 1003. In FIG. 10B, micrographs show activated regions on the different absorber patterns 1000-1003 shown in FIG. 10A for identical 200 ms laser exposure times. As seen by the dimensions on the activated regions, higher absorber fill factors activate larger areas. In FIG. 10C, a graph shows the size of activated region vs. exposure duration for the four different transfer head absorber patterns 1000-1003.

Figure 11:
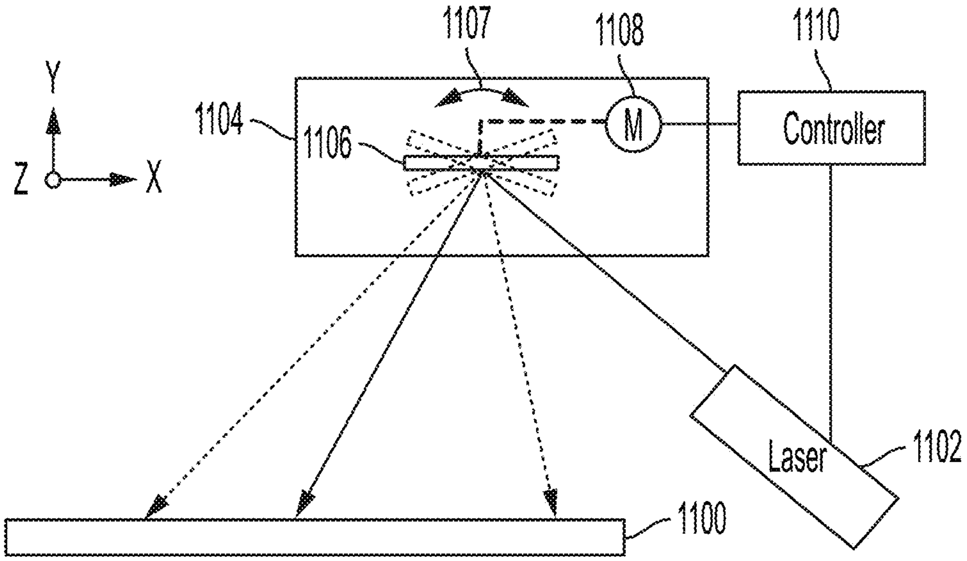
FIG. 11 is a diagram of an optical scanner used for selective heating of a transfer head according to example embodiments.

As noted above, the laser or other optical energy source can selectively heat parts of the transfer layer. In FIG. 11, a block diagram shows an example configuration of a heating subsystem using an optical scanner according to one or more embodiments. In this figure, a transfer layer 1100 is part of a transfer head (not shown) as described elsewhere, and an optical absorber layer may also be used with the transfer layer but is omitted here for purposes of clarity. An optical energy source (e.g., laser 1102) and scanning optics 1104 may be integrated with the transfer head or located externally to the transfer head. In this example, the scanning optics 1104 includes at least one or more movable mirrors 1106 and one or more motors 1108. Other components may be included in the scanning optics, such as lenses, polarizers, collimators, etc.

The movable mirror 1106 is shown rotating as indicated by the arrow 1107. A single axis rotation such as the illustrated z-axis rotation can facilitate scanning along a single row of a rectangular matrix of chiplets located below the transfer layer 1100. The mirror 1106 and motor 1108 can also be configured to rotate about a second axis, e.g., the z-axis, to scan an adjacent row. A second mirror and motor (not shown) may also be used to affect a change in rows. In other embodiments, the mirror 1106 and motor 1108 could be configured to rotate about the y-axis, thereby resulting in a polar coordinate pattern being illuminated. Translations of mirrors may also be used instead of or in addition to the rotations described above.

One or more controllers 1110 are coupled to the one or more motors 1108 and facilitates precise movement of the mirror 1106, e.g., via servo control. The controller(s) 1110 also control output of the laser 1102, such that a spot on the transfer layer 1100 is illuminated or not-illuminated based on whether heating is desired at a current location at which the laser beam is aimed. This can be achieved by turning the laser 1102 off and on, activating a shutter that blocks or redirects light emitted from the laser, etc. The configuration shown in FIG. 11 can be extended to use more than one laser and/or optical scanner.

As noted above, selective heating of the transfer layer facilitates picking up a subset of chiplets or other objects from a donor surface/substrate while leaving other chiplets/objects behind. Once this subset of chiplets is moved to the target surface/substrate, it may often be the case that all of the subset of chiplets will be released at the same time. Thus the entire transfer layer can be heated in order to achieve this. While an optical energy source can be used that illuminates the entire transfer layer (and associated optical absorber, if used), in other cases, a less complicated or expensive, full-surface heating means may be used for the release stage of the transfer operation.

Figure 12:
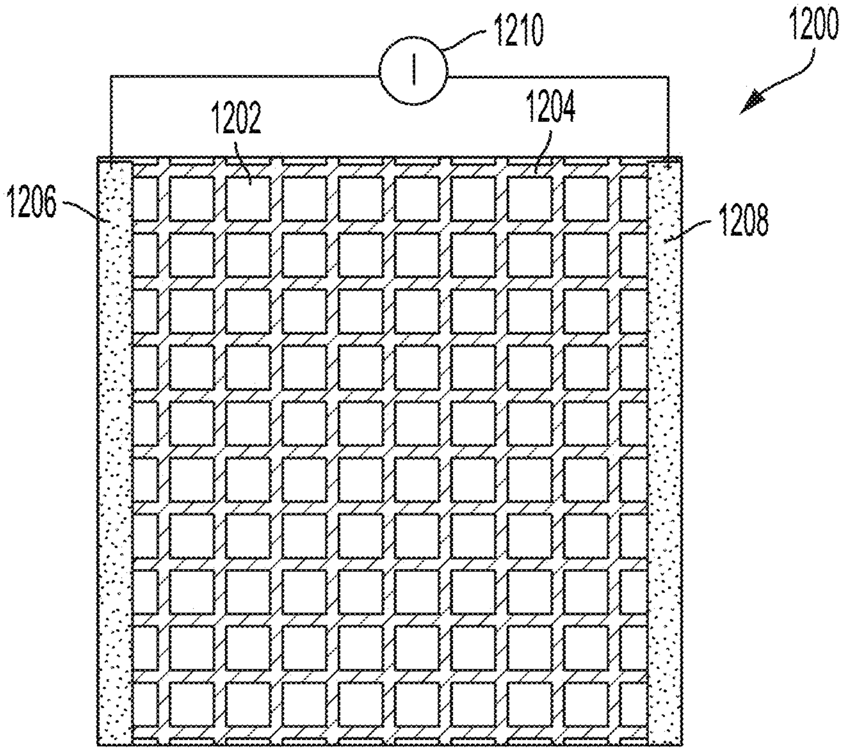
FIGS. 12, 13, and 14 are views showing non-selective heating arrangements for a transfer head according to example embodiments.

In FIG. 12, a plan view shows a non-selective heating arrangement for a transfer head 1200 according to an example embodiment. The transfer head 1200 includes a transfer layer 1202 and a conductive mesh 1204 in contact with the transfer layer 1202. The conductive mesh 1204 may be a mesh-patterned absorber layer as described above, e.g., as shown in FIGS. 6 and 9. In embodiments such as shown in FIG. 7, where the transfer layer is partially or fully populated with molecules/particles of an absorber material mixed in with the transfer layer material, the conductive mesh 1204 may be a conductive grid of wires or other structures overlaid on the transfer layer 1202. The conductive mesh 1204 may be formed of a metal, metal oxide, or other electrically conductive material (e.g., carbon).

Electrodes 1206, 1208 are electrically coupled to opposing edges of the conductive mesh 1204. An electrical current can be applied to the electrodes 1206, 1208, e.g., by current source 1210, such that the electrical current flows across the conductive mesh 1204, which generates heat due to electrical resistance of the conductive mesh 1204. This heat is transferred to the transfer layer 1202, which softens at higher temperatures and allows any chiplets attached to the transfer layer 1202 to be released.

Figure 13:
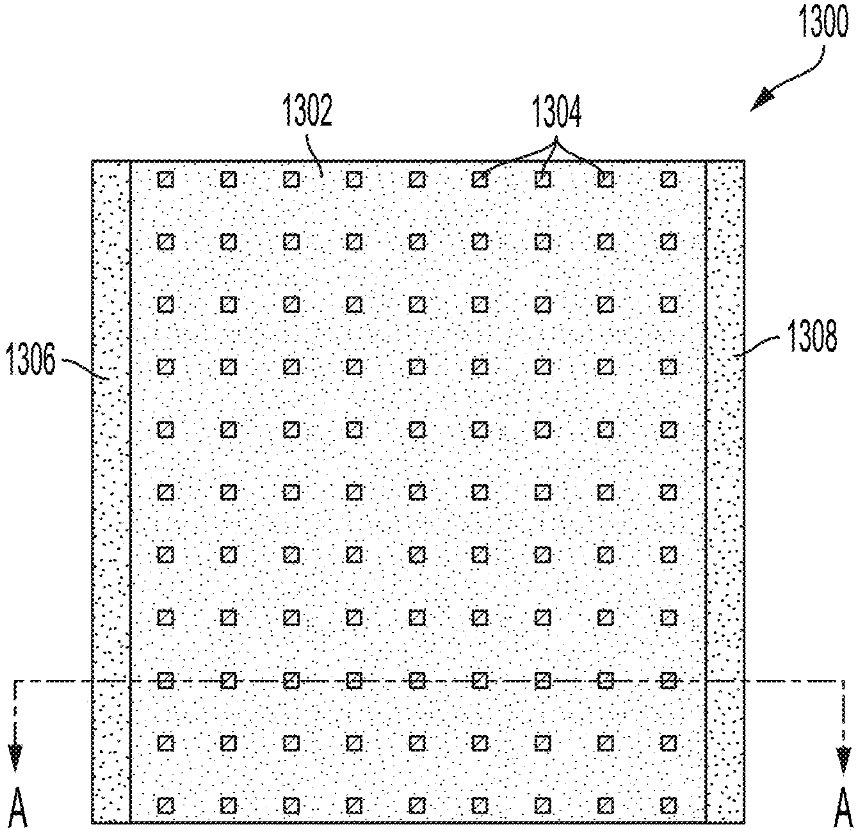
Figure 14:
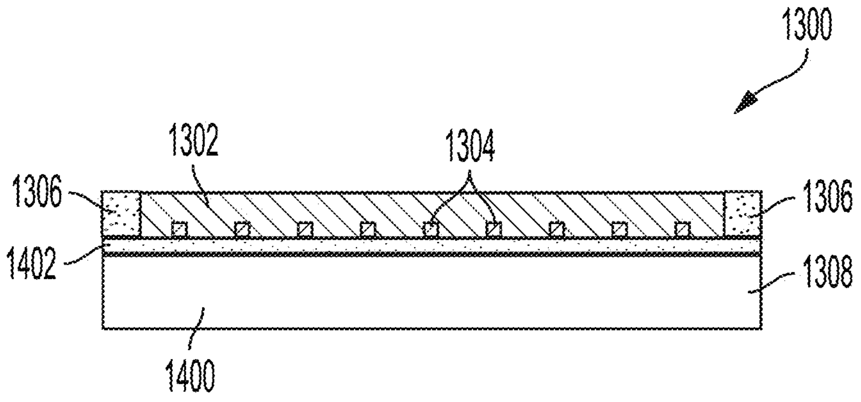

In FIGS. 13 and 14, plan and cross-sectional views show a non-selective heating arrangement for a transfer head 1300 according to another example embodiment. The transfer head 1300 includes a transfer layer 1302 and a non-contiguous absorber layer 1304 in contact with the transfer layer 1302. The absorber layer 1304 has a dot matrix pattern in this example, although the concepts described regarding this example may apply to any pattern in which there is not a current path through the absorber layer 1304 from between opposing sides of the transfer layer 1302.

Electrodes 1306, 1308 are electrically coupled to opposing edges of the transfer head 1300. Because the absorber layer 1304 is not contiguous between edges of the transfer layer 1302, the absorber layer 1304 cannot carry current as shown in FIG. 12. Instead, as seen in FIG. 14, a conductive layer 1402 is shown placed between the transfer layer 1302 and a base structure 1400 (e.g., transparent substrate). The conductive layer 1402 may also electrically couple the non-contiguous elements of the absorber layer 1304. A current applied to the electrodes 1306, 1308 causes current to flow across the conductive layer 1402, which generates heat due to electrical resistance of the conductive layer 1402. This heat is transferred to the transfer layer 1302, which softens at higher temperatures and allows any chiplets attached to the transfer layer 1302 to be released. The conductive layer 1402 may be formed of an optically transparent conductor such as at least one of indium tin oxide (ITO), zinc oxide (ZnO), fluorine doped tin oxide, conductive polymers, carbon nanotubes, or graphene.

It may be frequently desirable to perform a thermal cycle between transfer operations to recondition the transfer layer and to smooth out surface features formed on transfer layer during the previous operation. This involves, for example, heating and cooling the transfer layer above and below Tg one or more times while no objects are attached to the transfer layer. Any of the selective or non-selective heating arrangements described above can be used for this thermal cycling.

Figure 15:
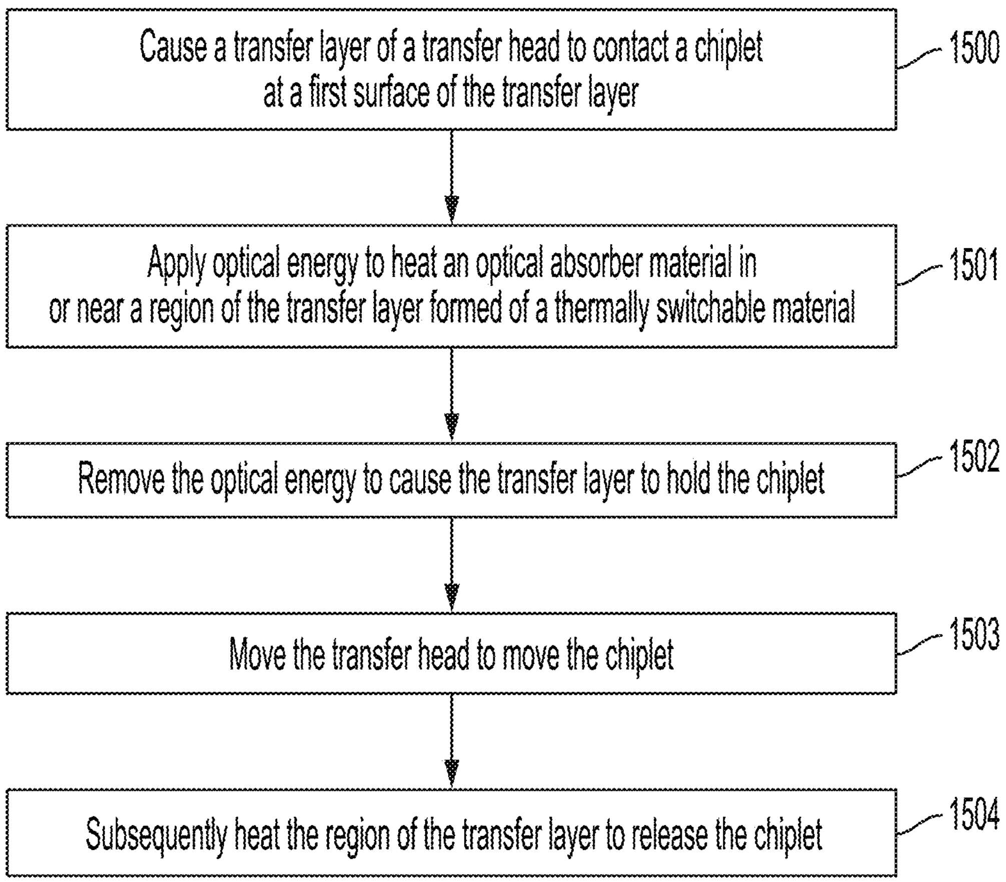
FIG. 15 is a flowchart of a method according to an example embodiment.

In FIG. 15, a flowchart shows a method according to an example embodiment. The method involves causing a transfer layer of a transfer head to contact 1500 a chiplet at a first surface of the transfer layer. This may involve moving one or both of the transfer head and a donor substrate on which the chiplet is located. Optical energy is applied 1501 to heat an optical absorber material in or near a region of the transfer layer formed of a thermally switchable material that undergoes a phase change when heated resulting in the region conforming to the chiplet. The heated region corresponds to a location of the chiplet. The optical energy is removed 1502 to cause the transfer layer to hold the chiplet. The transfer head is moved 1503 relative to a donor substrate or surface to move the chiplet, which may involve moving one or both of the transfer head and the donor substrate. The region of the transfer layer is subsequently heated 1504 to release the chiplet. The phase transition that enables holding and releasing of the chiplet by the transfer layer is repeatable and reversible.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise. Generally such terms are used herein to describe an orientation shown in the figure, and unless otherwise specified, are not meant to limit orientation of physical embodiments, e.g., relative to the Earth's surface.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A transfer apparatus, comprising:

a transfer layer formed of a thermally switchable material that undergoes a phase change when heated, a first side of the transfer layer being placed in contact with a chiplet during a transfer operation;

an optical absorber material thermally coupled to the transfer layer, the optical absorber material comprising a pattern configured to facilitate detection of one or more alignment fiducials during the transfer operation, the one or more alignment fiducials disposed on one or both of the transfer layer and the chiplet; and an optical energy source operable to apply optical energy to the optical absorber material to selectively heat a region of the transfer layer that corresponds to a location of the chiplet, the region holding the chiplet when the optical energy is removed during the transfer operation, the region being subsequently heated during the transfer operation to release the chiplet, wherein the transfer layer is reusable for repeated transfer operations.

2. The transfer apparatus of claim 1, wherein the optical absorber material comprises an optical absorber layer coupled to a second side of the transfer layer opposed to the first side.

3. The transfer apparatus of claim 2, wherein the optical absorber layer comprises one of or a combination of metal, carbon, and semiconductor.

4. The transfer apparatus of claim 3 wherein the metal comprises one of or a combination of Pt, Ni, Ti, Cr, Mo, and Cu.

5. The transfer apparatus of claim 3 wherein the semiconductor comprises at least one of silicon, amorphous silicon, polysilicon, and TiN.

6. The transfer apparatus of claim 3, wherein the optical absorber layer does not provide a contiguous current path between opposing edges of the transfer layer, the transfer apparatus further comprising:

an optically transparent conductive layer in thermal contact with the transfer layer; and two or more electrodes coupled to pass an electrical current across the optically transparent conductive layer, the electrical current heating the transparent conductive layer to non-selectively perform the subsequent heating of the transfer layer.

7. The transfer apparatus of claim 6, wherein the optically transparent conductive layer includes at least one of ITO, ZnO, fluorine doped tin oxide, conductive polymers, carbon nanotubes, or graphene.

8. The transfer apparatus of claim 2, further comprising two or more electrodes coupled to pass an electrical current across the optical absorber layer, the electrical current heating the absorber to non-selectively perform the subsequent heating of the transfer layer.

9. The transfer apparatus of claim 2, wherein the pattern exposes portions of the second side of the transfer layer such that objects can be viewed through the transfer layer during the transfer operation.

10. The transfer apparatus of claim 9 wherein the pattern comprises at least one of spaced-apart lines, a mesh, and an array of dots.

11. The transfer apparatus of claim 1, wherein the optical absorber layer comprises constituents of an optically absorbing material mixed in with the thermally switchable material.

12. The transfer apparatus of claim 1, wherein the thermally switchable material comprises a shaped memory polymer.

13. The transfer apparatus of claim 12 wherein the shaped memory polymer comprises stearyl acrylate.

14. The transfer apparatus of claim 1, wherein the optical energy source is a scanned laser beam.

15. The transfer apparatus of claim 1, wherein the subsequent heating is performed by optical exposure, laser irradiation, infrared lamp heating, electrical joule heating, inductive heating, RF heating, hot plate heating, conductive heating, convection heating, forced air, or a combination thereof.

16. The transfer apparatus of claim 1, wherein the transfer layer contacts a second chiplet that is not proximate the heated regions of the transfer layer, the second chiplet not being held by the transfer layer during the transfer operation.

17. A method, comprising:

causing a transfer layer of a transfer head to contact a chiplet at a first side of the transfer layer;

apply optical energy to heat an optical absorber material in or near a region of the transfer layer, the region corresponding to a location of the chiplet, the transfer layer formed of a thermally switchable material that undergoes a phase change when heated resulting in the region conforming to the chiplet, the optical absorber material comprising a pattern configured to facilitate detection of one or more alignment fiducials disposed on one or both of the transfer layer and the chiplet;

removing the optical energy to cause the transfer layer to hold the chiplet;

moving the transfer head relative to a donor substrate or surface to move the chiplet; and subsequently heating the region of the transfer layer to release the chiplet, wherein the transfer layer is reusable for repeated transfer operations.

18. The method of claim 17, wherein the transfer head comprises an optical absorber layer thermally coupled to a second side of the transfer layer opposed to the first side, wherein the optical energy induces heat in the optical absorber layer, the heat being transferred from the optical absorber layer to the transfer layer.

19. The method of claim 17, wherein the transfer layer comprises constituents of an optically absorbing material mixed in with the thermally switchable material, wherein the optical energy induces heat in the constituents of the optical absorbing material.

20. The method of claim 17, wherein the subsequently heating of the region of the transfer layer comprises non-selectively heating the transfer layer.

21. The method of claim 17, wherein the transfer layer contacts a second chiplet that is not proximate the heated regions of the transfer layer, the second chiplet not being held by the transfer layer and moved with the chiplet.

22. The method of claim 17, further comprising thermally cycling the transfer layer above and below a glass transition temperature after a transfer operation to smooth out surface features formed on transfer layer by the chiplet.

* * * * *